US007966560B2

(12) United States Patent
Kanzaki

(10) Patent No.: US 7,966,560 B2
(45) Date of Patent: Jun. 21, 2011

(54) LAYING OUT WEB COMPONENTS USING MOUNTING AND POOLING FUNCTIONS

(75) Inventor: Eisuke Kanzaki, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 903 days.

(21) Appl. No.: 11/872,416

(22) Filed: Oct. 15, 2007

(65) Prior Publication Data

US 2008/0098326 A1    Apr. 24, 2008

(30) Foreign Application Priority Data

Oct. 24, 2006   (JP) .................................. 2006-288400

(51) Int. Cl.
*G06F 17/00* (2006.01)
(52) U.S. Cl. ........................................ 715/273; 715/255
(58) Field of Classification Search .................. 715/200, 715/255, 273
See application file for complete search history.

(56) References Cited

U.S. PATENT DOCUMENTS

| 6,377,285 | B1* | 4/2002 | Doan et al. ..................... 715/764 |
| 7,082,568 | B2* | 7/2006 | Iwamoto et al. ............... 715/212 |
| 7,240,075 | B1* | 7/2007 | Nemirofsky et al. ................. 1/1 |
| 7,383,496 | B2* | 6/2008 | Fukuda .......................... 715/230 |
| 7,508,388 | B2* | 3/2009 | Barfuss et al. ................. 345/418 |
| 7,581,176 | B2* | 8/2009 | Wilson .......................... 715/243 |
| 7,594,194 | B2* | 9/2009 | Makela ......................... 715/864 |
| 2002/0073125 | A1* | 6/2002 | Bier ............................. 707/530 |
| 2005/0094206 | A1* | 5/2005 | Tonisson ...................... 358/1.18 |
| 2005/0246651 | A1* | 11/2005 | Krzanowski .................. 715/770 |
| 2005/0268226 | A1* | 12/2005 | Lipsky et al. ................. 715/515 |
| 2006/0064467 | A1* | 3/2006 | Libby .......................... 709/217 |
| 2006/0072029 | A1* | 4/2006 | Miyatake et al. ............. 348/340 |
| 2006/0212803 | A1* | 9/2006 | Arokiaswamy ............... 715/520 |
| 2006/0259859 | A1* | 11/2006 | Ivarsoy et al. ................ 715/520 |
| 2007/0011703 | A1* | 1/2007 | Anglin, Jr. ..................... 725/46 |
| 2008/0152297 | A1* | 6/2008 | Ubillos .......................... 386/52 |
| 2009/0207305 | A1* | 8/2009 | Fujita et al. ................... 348/468 |

FOREIGN PATENT DOCUMENTS

| JP | 2002-312090 | 10/2002 |
| JP | 2005-092563 | 9/2006 |
| JP | 2006-260131 | 9/2006 |

OTHER PUBLICATIONS

Kustanowitz et al., Meaningful Presentations of Photos Libraries: Rationale and Applications of Bi-Level Radial Quantum Layouts, Google 2005, pp. 1-9.*
Tan et al., WinCuts: Manipulating Arbitrary Window Regions for More Effective Use of Screen Space, ACM 2004, pp. 1525-1528.*

* cited by examiner

*Primary Examiner* — Cong-Lac Huynh
(74) *Attorney, Agent, or Firm* — Winstead, P.C.

(57) ABSTRACT

To edit a web page so that various contents can be displayed, while ensuring fine uniformity of the whole web page, a mount (board art) is displayed within the web page so that content, such as an image or a text, can be pasted in the mount. When pasting the content in the mount, the content is compressed or extended so as to fit in a predetermined region disposed within the mount regardless of a data amount of the content. By arranging the mount within the page, fine conformity of the whole page is achieved by proximity, alignment, and repetition of a plurality of mounts.

18 Claims, 7 Drawing Sheets

LAYING OUT WEB COMPONENTS USING MOUNTING AND POOLING FUNCTIONS

FIELD OF THE INVENTION

The present invention relates to an apparatus and method for laying out web pages, and particularly to an apparatus and method for laying out components displayed on the web page using mounting and pooling functions.

BACKGROUND

The term "web pages" means individual pages present on the World Wide Web, typically texts described in an HTML or XHTML format. The IBM homepage builder (R) is application software for efficiently editing web pages. A user can design a page by selecting display objects, such as images or texts, to be displayed on the web page and arranging them at desired positions, without worrying about a data format, such as the HTML, with which the web page should comply. The designed page is automatically converted to a file in the HTML or XHTML format.

However, even when using such application software, the user is required to have considerable skill for achieving fine uniformity of the whole page to be designed. Fine uniformity of the page is achieved by coordinating modes of mutual proximity, alignment, and repetition of the respective display objects arranged on the page.

Some current application software for editing the web page permit very precise arrangement of the display objects, by using WYSWYG (what you see is what you get), i.e., a technique for matching contents displayed on the edit screen and processing contents, particularly represented by printing. However, they are rather inefficient for unifying modes of mutual proximity, alignment, and repetition of the respective display objects over the whole web page.

Japanese Unexamined Patent Publication (Kokai) No. 2002-312090 (page 13 and FIG. 2) discloses a method for displaying contents of an information providing server on a web browser operating on a client machine which accesses the server. The web browser displays common information to respective clients who access the server, while having a function for each client to arbitrarily select and display desired contents. Each client can display the individually selected contents only within a format frame, referred to as a controller.

In this manner, it allows for each client to customize the screen while ensuring fine uniformity of the screen which the web browser of every client displays.

However, since the controller does not have a function to adjust a display mode, for example, a size, of each of the contents displayed therein, a user still can arbitrarily arrange the contents within the controller. Namely, the controller does not regulate the display mode of the contents.

As a result, in the controller, the adjustment of mutual proximity, alignment, and repetition of the respective contents is still entrusted to a user, and it is difficult to ensure fine uniformity of the appearance of the web screen.

SUMMARY

The present invention provides a computer system having an input device, a storage device, and a display device. The computer system includes: means for displaying a list of contents stored in the storage device on the display device; means for displaying a display object, which (1) can be rearranged at any position on the display device in response to an input from the input device, and (2) is associated with boundary information of a region included in the display object, on the display device; means for selecting at least one content in the list of contents in response to an input from the input device; means for reading out this selected content from the storage device; and means for converting and displaying an image corresponding to the thus retrieved content according to the above boundary information so that the above image is displayed within the above region.

In this manner, in the computer system according to the present invention, when the content selected by a user is further displayed on the display object which can be moved to any position on the display device, the boundary information of the region contained in the display object is referenced, and the image corresponding to the content is displayed within the region. Namely, once layout of the display object on the display device is fixed, the content to be further displayed thereon is displayed according to the boundary information associated with the display object, regardless of the original display mode of the content, so that relative position between the content and the display object is kept constant and fine uniformity of the whole screen displayed on the display device can be maintained.

The above display object may be selected from a group of display objects with different attributes in response to an input from the input device. Also, the display object may be changed in size in response to the input from the input device. When the size is changed, the boundary information related to the display object may be updated. In addition, when the display object is rearranged, it may be rearranged while maintaining the relative positions of the display object and the image displayed inside the boundary. Moreover, a second display object may be displayed, in which the display object can be rearranged on the second display object and further rearranged to outside the second display object.

BRIEF DESCRIPTION OF THE DRAWINGS

The invention is described in further detail below, taken together with the drawings, wherein.

DETAILED DESCRIPTION

Figure 1:
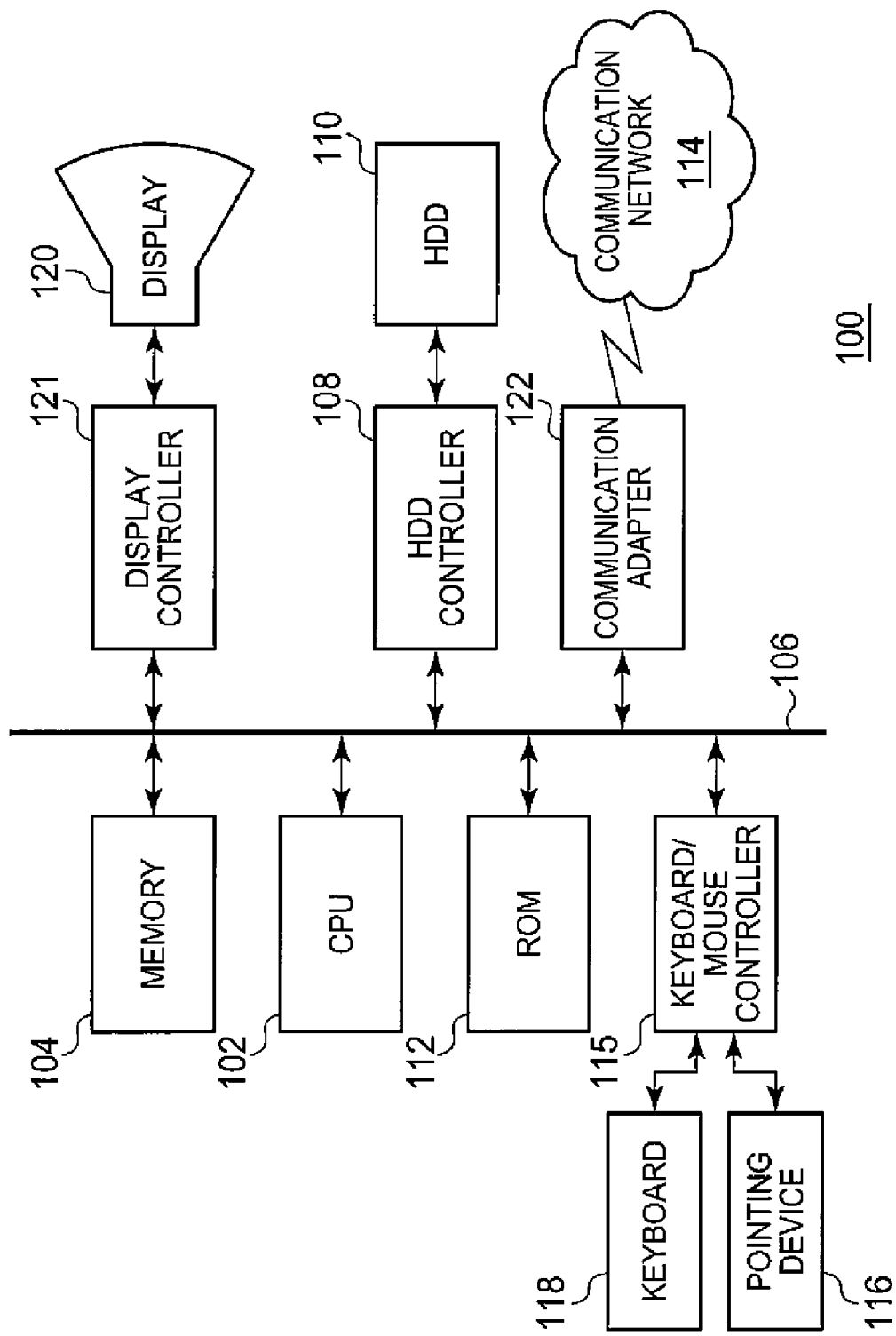
FIG. 1 is a view of an overview of hardware configuration for embodying a document editing apparatus 100 of the present invention.

FIG. 1 is a view of an overview of a hardware configuration for embodying a document editing apparatus 100 of the present invention. The document editing apparatus 100 includes a central processing device (CPU) 102 and a memory 104. The CPU 102 and the memory 104 are connected with a hard disk drive 110 as an auxiliary storage device via a bus 106 and a hard disk controller 108. A storage medium, such as the hard disk drive 110 or a ROM 112, can record codes of a computer program for embodying the present invention or various data which cooperate with an operating system to provide instructions to the CPU 102.

The codes of the computer program are executed by being loaded to the memory 104. The codes of the computer program can also be divided into a plurality of segments and recorded separately on a plurality of storage media. Alternatively, part of the segments of the divided codes can be recorded on a storage medium in another information processor connected to the document editing apparatus 100 via a communication network 114, so that the divided codes mutually cooperate. Distributing the divided codes to a plurality of devices and causing the codes to cooperate are embodied as a client server system, for example. It is a matter which can be appropriately selected upon designing the system to cause each device to execute which code to realize each function, and the present invention encompasses any of these forms.

The document editing apparatus 100 is further provided with user-interface hardware. The user-interface hardware includes, for example, a pointing device 116 (such as a mouse, a joystick, and a touchpad) for inputting screen position information, a keyboard 118 for supporting a key input, and a display 120 for presenting a text image to be edited for a user.

The document editing apparatus 100 according to the present invention can communicate with other computers or the like via a communication adapter 122. The above described hardware configuration can be embodied as various information processors, including personal computers, workstations, business equipments, home electric appliances, cellular phones, and car-mounted equipments. However, each of the above mentioned components is illustrative and not all the components are essential in the present invention.

Although the operating system which supports a graphics user interface multi-window environment as default, such as Windows XP (R), AIX (R), and Linux (R), is preferable, other operating systems are acceptable and the present invention is not limited to a particular operating system environment.

Figure 2:
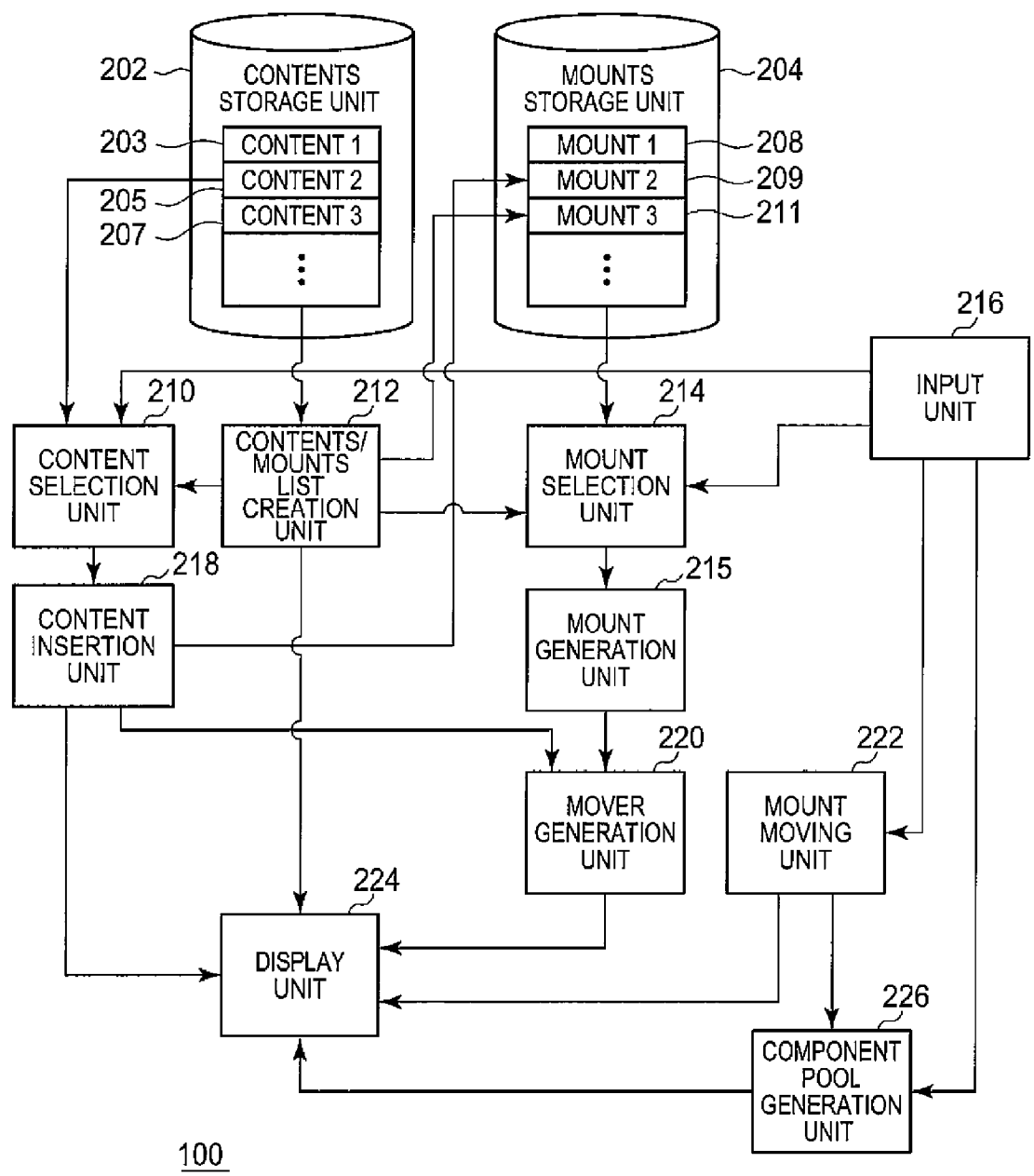
FIG. 2 is a functional block diagram of the document editing apparatus 100 of the present invention.

Next, a system configuration of the present invention is described with reference to FIG. 2. Functional blocks shown in FIG. 2 are logical functional blocks, and it does not necessarily mean that they are respectively realized by grouped hardware or software. Each functional block can be embodied by separate hardware, cooperation of hardware, or common hardware or software.

As for the data, names are used systematically, even when expression modes are different depending on the hardware components which carry the data. For example, contents 203, 205, and 207 mean display objects which are recognized by a user as texts, images, icons, operating buttons, moving images, pages, or the like, when they are displayed on the display 120; they means data in the memory 104, when they are targets of processing by respective functional blocks, as will be described below; and they means a group of data including necessary information in order that respective functional blocks materialize contents as display objects on the display 120, when they are stored in a contents storage device 202. Although each of them is called the content, the individual mode thereof will be understood from the context.

In a preferred embodiment of the present invention, the document editing system 100 includes the contents storage unit 202, a mounts storage unit 204, a content selection unit 210, a contents/mounts list creation unit 212, a mount selection unit 214, a mount generation unit 215, an input unit 216, a content insertion unit 218, a mover generation unit 220, a mount moving unit 222, a display unit 224, and a component pool generation unit 226.

Figure 3:
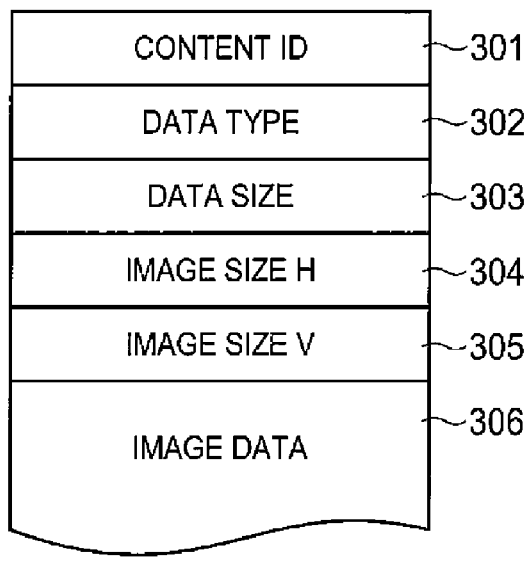
FIG. 3 is a view showing data contained in content.

The contents storage unit 202 stores a plurality of contents 203, 205, and 207 displayed in the text which is edited by the document editing system 100, such as texts, images, icons, operating buttons, moving images, pages, or the like. FIG. 3 shows the more detailed data contained in the content 203, for example. Content ID 301 may be a content number and is the information for specifying the content within the contents storage device 202. A data type 302 stores therein the information which indicates that the content is a type of the image, the moving image, the text, or the like. A data size 303 may be the number of bytes of the content in the form stored in the contents storage unit 202 or the number of pixels required to display the content on the display 120. When the content is the image, a horizontal image size 304 and a vertical image size 305 are stored. In addition, a content body 306, such as image data, is stored.

Here, the horizontal direction and the vertical direction mean two directions perpendicular to each other on a document editing screen displayed on the display 120, and the horizontal size and vertical size of the image each refers to the size along each direction when the image is displayed within the document editing screen. Referring again to FIG. 2, the mounts storage unit 204 stores a plurality of mounts 208, 209, and 211 displayed within the text which is edited by the document editing system 100. The mount is a type of the display object on the display 120, and is the display object which may be visually recognized by the user as a box, a frame, a board art, or the like. The user selects a mount from prepared various mounts and arranges it within the document editing screen. Further, a separately selected content can be arranged within the mount. The mount also has information which regulates the arrangement of the content, as will be described below; the user is no longer required to consider the layout of the content within the mount.

Figure 4:
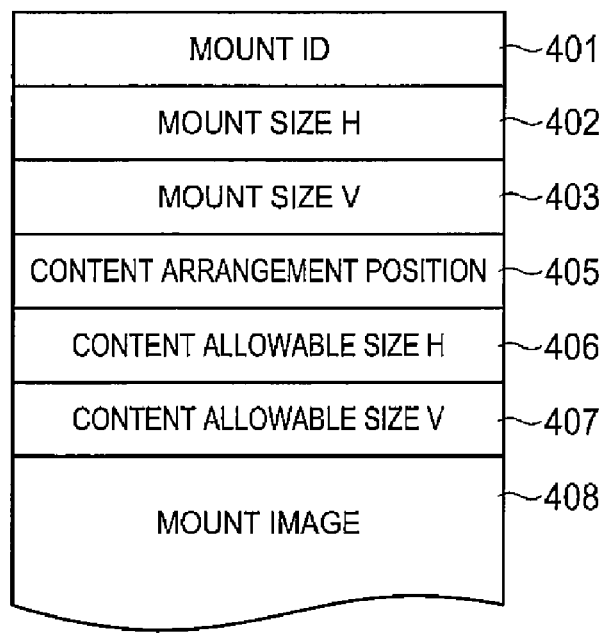
FIG. 4 is a view showing data contained in a mount.

Referring to FIG. 4, data contained in the mount 208 is described as an example. The mount 208 includes a mount ID 401 for identifying each mount, a horizontal mount size 402, a vertical mount size 403, and a mount image 408. The image of the mount preferably has an appearance on which a user of the document editing apparatus 100 intends to arrange another content, such as a board art with a decorated frame, a photography mounting, a bulleting board, or the like.

The mount also includes information regarding a boundary of a layout region 502 set in the mount, such as a position 405 at which the content is arranged, a size (vertical direction) 406 allowable for the content, a size (horizontal direction) 407 allowable for the content. In the layout region 502, a content 206 selected by the user is displayed within the boundary of the region. The operation thereof is described below.

Figure 5:
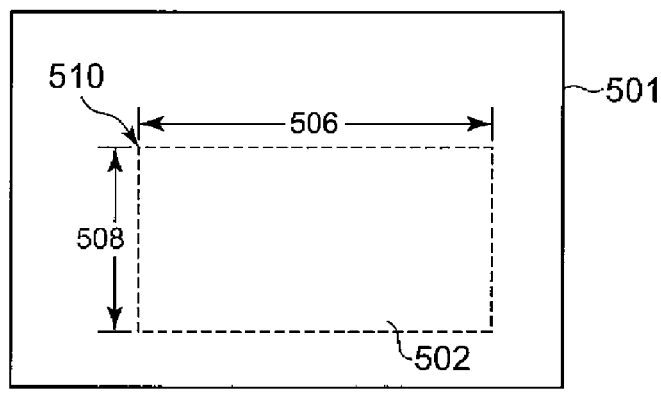
FIG. 5 is a view showing the mount and a layout region within the mount.

Here, referring to FIG. 5, the information regarding the boundary of the layout region 502 is described in detail. FIG. 5 shows a mount 501 displayed in the document editing screen. A layout region 502 is defined within the mount 501. The layout region 502 may be colored with a color different from that of the mount 501, or represented by a dotted line or the like on the boundary of the region, as shown in FIG. 5, so as to be visually recognizable by a user. Alternatively, the boundary may not be displayed for the user if it is sufficient that only the document editing apparatus 100 can identify the boundary. A content stored in the contents storage unit 202 and selected by the user is displayed in the layout region 502. The operation thereof is described below.

As the information regarding the boundary of the layout region 502, the mounts storage unit 204 stores, for each mount, a position 405 at which a content is arranged, a horizontal size 406 allowable for the content, and the vertical size 407 allowable for the content. The position at which the content is arranged may be, for example, a relative position within the mount 501 with respect to the upper left corner in the figure of the layout region 502. Typically, it is an (X, Y) coordinate of a point 510 in a coordinate system with an origin on the upper left corner of the mount, an X-axis on the upper side of the mount, and a Y-axis on the left side of the mount.

The horizontal size 406 allowable for the content is a horizontal width 506 of the layout region 502, while the vertical size 407 allowable for the content is a vertical height 508 of the layout region 502. It is possible to define the boundary of the layout region 502 within the mount 501 using these three pieces of information. However, this is one example. In brief, any information or combination of pieces of information may be used as long as the information is that which can specify the boundary of the layout region 502 within the mount 501.

Returning to FIG. 2, the contents/mounts list creation unit 212 accesses the content storage unit 202 and creates a list of contents 203, 205, and 207 stored therein. The list may be in the form of listing the content IDs or listing the icons (not shown) corresponding to the content IDs. The created list is sent to the display unit 224. The contents/mounts list creation device 212 also creates a list of the mounts 208, 209, and 211 and sends it to the display unit 224, in a similar manner.

The content selection unit 210 and the mount selection unit 214 each identifies the content or the mount selected by the user based on the user input received from the input unit 216. The mount generation part 215 reads out the selected mount from the mounts storage unit 204 and generates the mount. The mover generation unit 220 generates a button (mover) for moving the mount to a given position of the mount generated by the mount generation unit 215.

Here, "generation" refers, in an example where the mount is generated, to deploy the mount image 408 in the memory 104 based on the horizontal size of the mount 402 and the vertical size of the mount 403, and to bring the data into a mode by which the mount can be displayed on the display device by the display unit 224. The mount moving unit 222 notifies the new display position of the mount of the display unit 224 based on the user input (typically, operation by the user to select and move the mover on the mount) received from the input unit 216. The display unit 224 re-displays the mount on the new display position.

The content insertion unit 218 inserts the content selected by the content selection unit 210 in the layout region within the mount selected by the mount selection unit 214. "Insertion" refers to deforming the content based on the size of the boundary of the layout region and arranging it within the layout region. Specifically, the content insertion unit 218 calculates a ratio of the horizontal size of the image 304 of the content to the horizontal size 406 allowable for the content, and compresses or extends the content in the horizontal and vertical directions based on the ratio to insert the content so that it fits within the layout region. When the content does not fit within the layout region even after compression based on the ratio, the image displayed at a part where the content is beyond the layout region may be trimmed.

Alternatively or according to another variation, the content insertion unit 218 may extract a part of the image in the content, based on the horizontal size 406 allowable for the content and the vertical size 407 allowable for the content, and insert it in the layout region. Although the content inserted in the mount is moved while maintaining the relative position to the mount when the mount is moved by the mount moving unit 222, it still can be distinguished from the mount and erased or replaced with the new other content by operation of the user.

It is also possible to display the mover by the mover generation unit 220 on the content inserted by the content insertion unit 218. The user can rearrange the content on the mount by operating the mover. For example, as is described below with reference to FIG. 6, when there are a plurality of layout regions within the mount, the user can move the content among the plurality of layout regions or move the content to the layout regions in the other mounts.

The component pool generation unit 226 generates a component pool, as an individual display region aside from the display screen as the target of editing by the document editing apparatus 100, and sends it to the display unit 224. The component pool is a buffer display region for temporarily saving the content, the mount, or the mount into which the content is inserted. By the mount moving unit 222, the content, the mount, or the mount into which the content is inserted is moved to/from the component pool.

The display unit 224 controls a display controller based on data generated, for example, by the content insertion unit 218, the contents/mounts list creation unit 212, the mover generation unit 220, the mount moving unit 222, the component pool generation unit 226, and the mount generation unit 215, respectively, to rewrite the displayed content on the display 120.

Although it is not fully described herein, the text as the target of editing displayed on the display screen is converted into a corresponding page description language (for example, the HTML) by the document editing apparatus 100 and stored in the storage unit.

Figure 6:
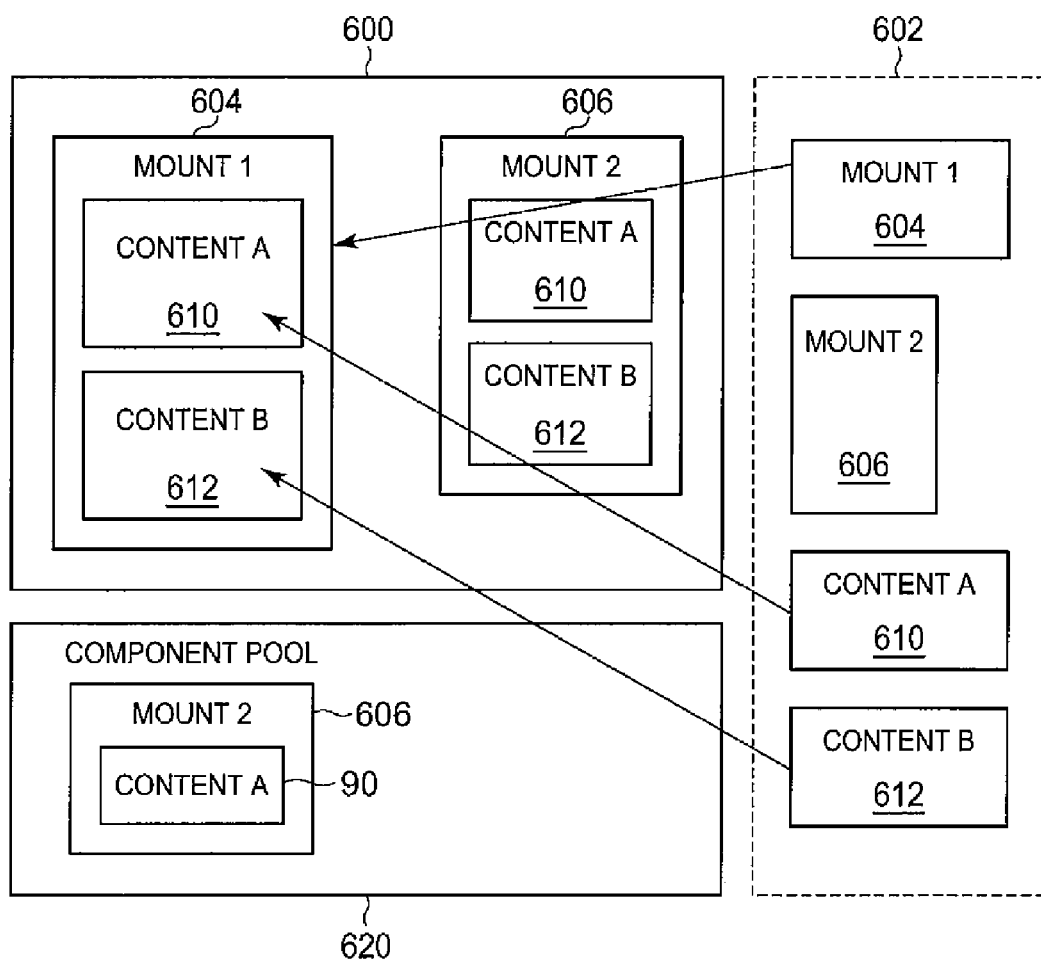
FIG. 6 is a conceptual diagram of a screen displayed by the document editing apparatus 100 according to the present invention on a display 120.

FIG. 6 is a conceptual diagram of the screen displayed by the document editing apparatus 100 according to the present invention on the display 120. Referring to FIG. 6, the operation by the user of the document editing apparatus 100 according to the present invention is schematically described. The following operation includes one that is automatically performed at the time of starting the document editing apparatus 100 and one that is performed in response to the user operation, but which event is applied as a trigger of the operation can be appropriately designed and is not specifically explained in general unless the added explanation is needed.

First, a web page 600 as the target of editing and a contents/mounts list 602 are displayed. In the contents/mounts list 602, a list of a mount 1 604, a mount 2 606, a content A 610, and a content B 612, which are available, is displayed. The size of the mounts may be appropriately changed according to the operation of the user.

In this example, the mount 1 604 include two layout regions 610 and 612. When the user drags and drops the content A 610 on the layout region 610, the content A is deformed so as to be displayed within the region of the layout region 610 to be displayed.

Similarly, the content B 612 is displayed within another layout region 612. FIG. 6 shows another mount 2 606. The size of the mount 2 606 is smaller than the mount 1 604, and the sizes of the layout regions 610 and 612 included therein are also smaller than the layout regions in the mount 1. However, when the user drags and drops the content A and the content B within these layout regions as well, the contents A and B are deformed so as to fit in the sizes of the smaller layout regions and displayed.

In this manner, the user can appropriately arrange the mount 1 604 and the mount 2 606 on the web page and can change the sizes thereof if needed. The user only drags and drops the contents on the layout regions of these mounts to display the contents with the proper size corresponding to the size of the mount. Since the position and size of the layout region within the mount is predetermined, the contents can be replaced with easy operation without losing fine uniformity of the web page 600.

Also, the document editing apparatus 100 can display a component pool 620. The user can move the mount in which the content is inserted, the content, or the mount mutually between the web page 600 and the component pool 620. The component pool 620 may be used as a storage region of the content or the mount. For example, the user may desire to try different arrangement of the mount after arranging the mount on the web screen and inserting the content therein, but before making final decision to display the completed mount on the web page. In such a case, by temporarily saving the mount in the component pool and arranging the different mount in the original position, the user can avoid that the web page 600 under editing to be complicated.

Alternatively, by storing various mounts with the contents inserted therein in the component pool and editing various web pages under the rule that the mounts in the component pool are primarily used upon editing the web page, fine uniformity may be maintained among different web pages.

Figure 7:
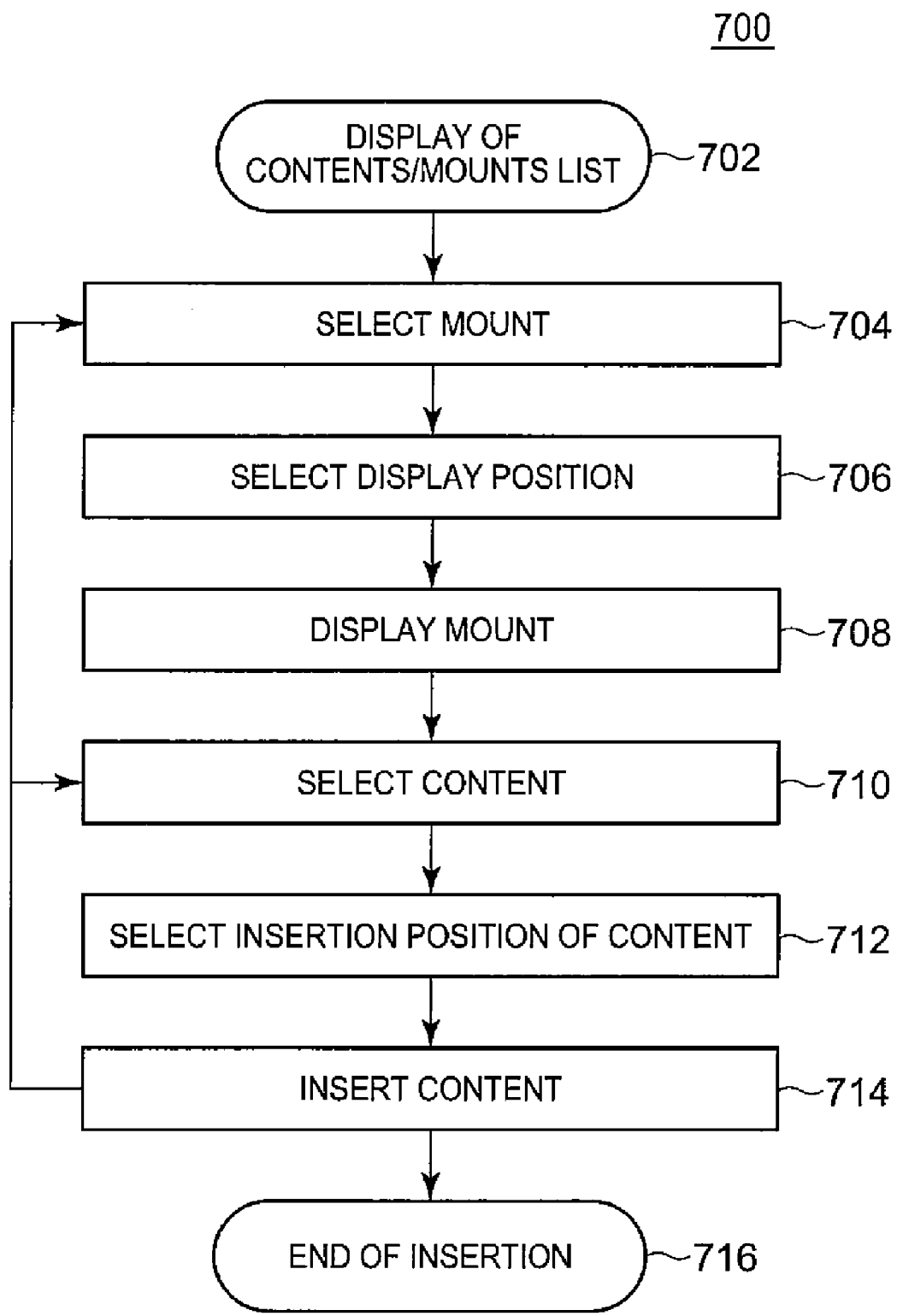
FIG. 7 is a process flow chart for inserting the content in the mount.

Hereinbelow, a process flow for realizing the above described user operation is described. First, the process flow for inserting the content in the mount is described with reference to FIG. 7. The contents/mounts list creation unit 212 accesses the contents storage unit 202 and the mounts storage unit 204, and creates the list of the stored contents/mounts 602. The created list is sent to the display unit 224 and displayed on the display 120 (Step 702).

When the mount in the contents/mounts list 602 is selected by the user, the selection is detected by the input unit 216 (Step 704), and the selected mount is identified by the mount selection unit 214 in response to the detection. The identified mount is retrieved by the mount generation unit 215 from the mounts storage unit 204, and generated, and the mover is further added by the mover generation unit if needed. The generated mount is displayed at the position specified by the user (Step 706) on the display by the display unit 224 (Step 708).

Next, when the content in the contents/mounts list 602 is selected by the user, the selection is detected by the input unit 216 (Step 710), and the selected content is retrieved by the content selection unit 210 in response to the detection from the contents storage unit 202. The user selects the position in the mount in which the content should be inserted (Step 712). For example, the position in which the content should be inserted is selected by the operation such as dragging and dropping the content 610 in the layout display region 610 of FIG. 6.

The content insertion unit 218, according to the procedure described in "B: System Configuration," inserts the content in the layout region within the mount specified by the user (Step 714). The mount in which the content is inserted is re-displayed on the display 120 by the display unit 224 (Step 716).

Figure 8:
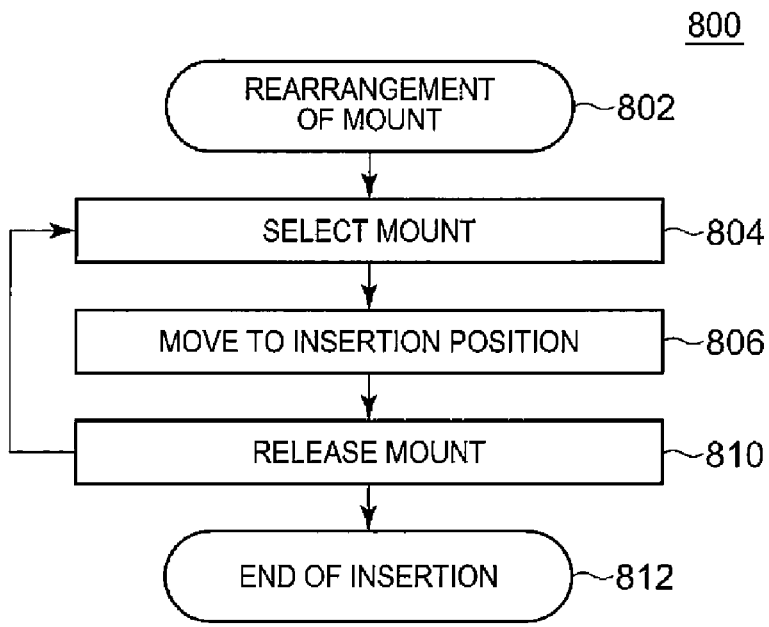
FIG. 8 is a process flow chart for moving the mount within a document editing screen.

Next, referring to FIG. 8, the process flow in the case where the mount is moved within the document editing screen is described. When the selection of the mount by the user is detected by the input unit 216 (Step 804), the mount moving unit 222 moves the mount to the position specified by the user (Step 806). At this time, the content inserted in the layout region within the mount is also moved while maintaining the relative position within the mount.

Figure 9:
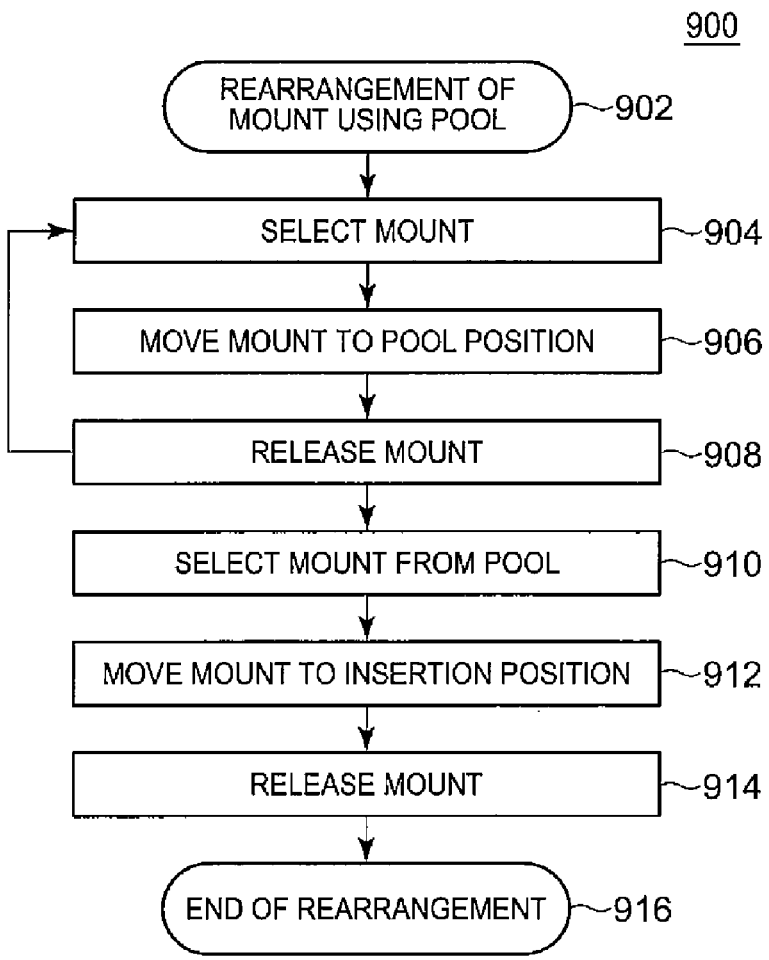
FIG. 9 is a process flow chart for moving the mount between a component pool and the document editing screen.

The movement of the mount is ended by releasing the selection of the mount by the user (Step 810). The releasing is dropping operation of the mount by the mouse, for example. The mount after the movement is displayed on the display 120 by the display unit 224. Next, referring to FIG. 9, the process flow in the case where the mount is moved between the component pool and the document editing screen is described.

When the selection of the mount within the document editing screen by the user (Step 904) and the subsequent movement thereof to the component pool are detected, the mount moving unit 222 instructs the component pool generation unit 226 to display the mount. The component pool generation unit 226 displays the mount within the component pool (Step 906), and completes the movement when the selection of the mount by the user is released (Step 908).

Similarly, when the selection of the mount displayed within the component pool is detected by the input unit 216 (Step 910), the mount moving unit 222 moves the mount to the position within the new document editing screen specified by the user (Step 912), and ends moving processing when the selection of the mount by the user is released (Step 914).

Figure 10:
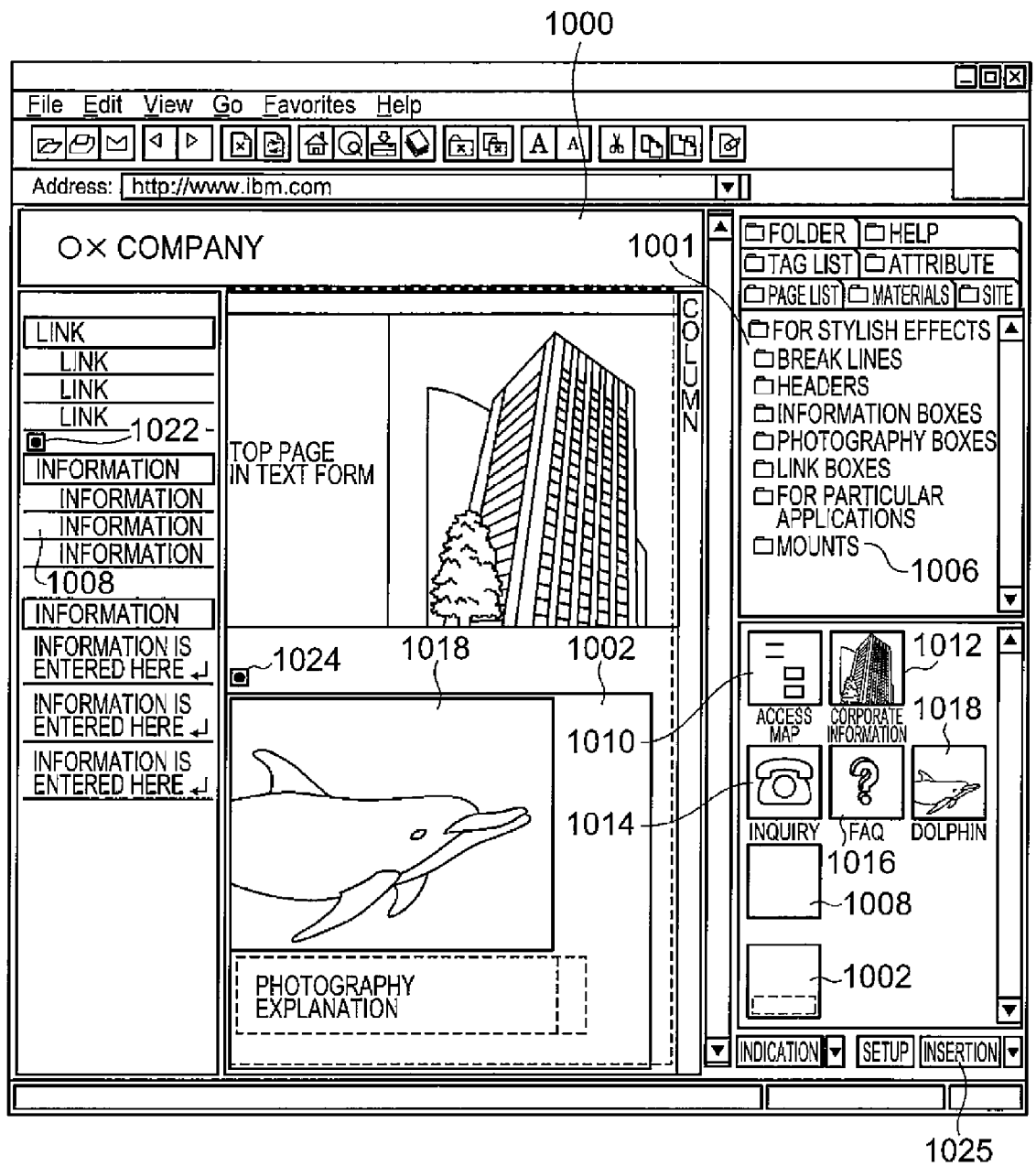
FIG. 10 shows a specific example of the document editing screen displayed by the document editing apparatus 100 according to the present invention.

FIG. 10 shows a specific example of the document editing screen displayed by the document editing apparatus 100 according to the present invention. A mounts/contents list 1001 is displayed on the right outer side of a document editing screen 1000. The list has a hierarchical directory structure, wherein the mounts and contents are displayed in an organized manner based on the types (1006).

Individual contents 1010, 1012, 1014, 1016, and 1018, as well as mounts 1002 and 1008, are displayed below the mounts/contents list 1001. The user selects any mount from the prepared various mounts and instructs so that the mount is inserted in the document editing screen 1000 (insertion button 1025). The selected mount is displayed on the position specified by the user.

Further, the user can drag and drop the content within the mount displayed on the document editing screen 1000, to display the content at a given position within the mount, namely, in the layout region. In this example, the content 1018 is expanded so as to fit to the size of the mount 1002 and displayed thereon. Movers 1022 and 1024 are arranged on the mount, and the user can operate the mover to move the mount and the content displayed therein collectively.

The document editing apparatus 100 converts the thus edited document into the page description language (for example, the HTML) and stores it as a page file in the storage unit. As described above, according to the present invention, the mounts with predetermined outlines or internal layout information are prepared. The mounts allow the contents to be displayed therein, while the contents are appropriately deformed according to the layout information attached to the mounts and displayed within the mount. Hence, the user can focus on arranging the mounts within the document editing screen, and can design the screen without considering display modes (position or form of displaying) of the respective contents.

What is claimed is:
1. A document editing apparatus comprising:
   a memory unit for storing a computer program for laying out components displayed on a web page; and a processor coupled to said memory unit, wherein said processor, responsive to said computer program, comprises:
- circuitry for displaying a list of contents stored in the storage device on the display device;
- circuitry for displaying a display object, which can be rearranged at any position on the display device in response to an input from the input device and which is associated with boundary information of a region included in the display object, on the display device;
- circuitry for selecting at least one content in the list of contents in response to an input from the input device;
- circuitry for retrieving the selected content from the storage device; and
- circuitry for displaying an image corresponding to the retrieved content according to the boundary information so that the image is displayed within the region.

2. The document editing apparatus according to claim 1, wherein the display object is selected from a group of display objects with different attributes in response to the input from the input device.

3. The document editing apparatus according to claim 1, wherein said processor further comprises:
- circuitry for changing a size of the display object, in response to the input from the input device.

4. The document editing apparatus according to claim 3, wherein said processor further comprises:
- circuitry for updating the boundary information of the display object based on the size of the display object changed by the means for changing the size.

5. The document editing apparatus according to claim 1, wherein the rearrangement of the display object is performed while maintaining relative positions of the display object and the image displayed within the region.

6. The document editing apparatus according to claim 1, wherein said processor further comprises:
- circuitry for displaying a second display object on the display device, wherein the display object can be rearranged on the second display object and further rearranged to outside the second display object.

7. A document editing program product for causing a computer having an input device, a storage device, and a display device, to function as:
- means for displaying a list of contents stored in the storage device on the display device;
- means for displaying a display object, which can be rearranged at any position on the display device in response to an input from an input device and which is associated with boundary information of a region included in the display object, on the display device;
- means for selecting at least one content in the list of contents in response to an input from the input device;
- means for retrieving the selected content from the storage device; and
- means for displaying an image corresponding to the retrieved content based on the boundary information so that the image is displayed within the region.

8. The document editing program product according to claim 7, wherein the display object is selected from a group of display objects with different attributes, in response to the input from the input device.

9. The document editing program product according to claim 7, further functioning as means for changing a size of the display object in response to the input from the input device.

10. The document editing program product according to claim 9, further functioning as means for updating the boundary information of the region based on the size of the display object changed by the means for changing the size.

11. The document editing program product according to claim 7, wherein the rearrangement of the display object is performed while maintaining relative positions of the display object and the image displayed inside the boundary of the region.

12. The document editing program product according to claim 7, further functioning as means for displaying a second display object on the display device, wherein the display object can be rearranged on the second display object and further rearranged to outside the second display object.

13. A document editing method in a computer system having an input device, a storage device, and a display device, the document editing method comprising:
- displaying a list of contents stored in the storage device on the display device;
- displaying a display object, which can be rearranged at any position on the display device in response to an input from the input device and which is associated with boundary information of a region included in the display object, on the display device;
- selecting at least one content in the list of contents in response to an input from the input device;
- retrieving the selected content from the storage device; and
- displaying an image corresponding to the retrieved content according to the boundary information so that the image is displayed within the region.

14. The document editing method according to claim 13, wherein the display object is selected from a group of display objects with different attributes, in response to the input from the input device.

15. The document editing method according to claim 13, further comprising the step of changing a size of the display object in response to the input from the input device.

16. The document editing method according to claim 15, further comprising the step of updating the boundary information of the region based on the changed size of the display object.

17. The document editing method according to claim 13, wherein the rearrangement of the display object is performed while maintaining relative positions of the display object and the image displayed inside the boundary of the region.

18. The document editing method according to claim 13, further displaying a second display object on the display device, wherein the display object can be rearranged on the second display object and further rearranged to outside the second display object.

* * * * *